(12) United States Patent
Le Hong et al.

(10) Patent No.: US 11,491,743 B2
(45) Date of Patent: Nov. 8, 2022

(54) CASING OF REINFORCED COMPOSITE MATERIAL, AND A METHOD OF FABRICATING IT

(71) Applicant: SAFRAN AIRCRAFT ENGINES, Paris (FR)

(72) Inventors: Son Le Hong, Moissy-Cramayel (FR); Roland José Yann Mortier, Moissy-Cramayel (FR); Antoine Phelippeau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 643 days.

(21) Appl. No.: 16/203,020

(22) Filed: Nov. 28, 2018

(65) Prior Publication Data

US 2019/0160765 A1    May 30, 2019

(30) Foreign Application Priority Data

Nov. 30, 2017   (FR) ...................................... 1761463

(51) Int. Cl.
   *F01D 25/24*        (2006.01)
   *B29C 70/32*        (2006.01)
   (Continued)

(52) U.S. Cl.
   CPC .............. *B29C 70/32* (2013.01); *B29C 70/24* (2013.01); *B29C 70/462* (2013.01); *B29C 70/48* (2013.01);
   (Continued)

(58) Field of Classification Search
   CPC ....... B29C 70/32; B29C 70/24; B29C 70/462; B29C 70/48; B29C 70/865; C04B 35/524;
   (Continued)

(56) References Cited

U.S. PATENT DOCUMENTS

| | | | |
|---|---|---|---|
| 4,534,698 A | * | 8/1985 | Tomich ................. F01D 21/045 |
| | | | 415/121.2 |
| 4,699,567 A | * | 10/1987 | Stewart ................. F01D 21/045 |
| | | | 415/200 |

(Continued)

FOREIGN PATENT DOCUMENTS

| | | |
|---|---|---|
| EP | 2 070 689 A2 | 6/2009 |
| FR | 3 037 854 A1 | 12/2016 |

(Continued)

OTHER PUBLICATIONS

Search Report as issued in French Patent Application No. 1761463, dated Aug. 14, 2018.

*Primary Examiner* — Hung Q Nguyen
*Assistant Examiner* — Anthony Donald Taylor, Jr.
(74) *Attorney, Agent, or Firm* — Pillsbury Winthrop Shaw Pittman LLP

(57) ABSTRACT

A method of fabricating a gas turbine casing out of composite material of varying thickness, the method including making a strip-shaped fiber texture by three-dimensional weaving; winding the fiber texture as a plurality of superposed layers onto a mandrel of profile corresponding to the profile of the casing that is to be fabricated, so as to obtain a fiber preform of shape corresponding to the shape of the casing that is to be fabricated; and densifying the fiber preform with a matrix; wherein, before beginning to wind the fiber texture onto the mandrel, a reinforcing band of width smaller than the width of the fiber texture is placed on the mandrel in a zone that is to form a retention zone of the casing.

13 Claims, 3 Drawing Sheets

(51) Int. Cl.
*B29C 70/48* (2006.01)
*B29C 70/46* (2006.01)
*C04B 35/524* (2006.01)
*C04B 35/571* (2006.01)
*C04B 35/80* (2006.01)
*B29C 70/24* (2006.01)
*B29C 70/86* (2006.01)
*B29L 31/00* (2006.01)
*B29L 31/30* (2006.01)

(52) U.S. Cl.
CPC ......... *B29C 70/865* (2013.01); *C04B 35/524* (2013.01); *C04B 35/571* (2013.01); *C04B 35/80* (2013.01); *F01D 25/24* (2013.01); *B29L 2031/3076* (2013.01); *B29L 2031/7504* (2013.01); *C04B 2235/5252* (2013.01); *C04B 2235/616* (2013.01)

(58) Field of Classification Search
CPC ......... C04B 35/571; C04B 2235/5252; C04B 2235/616; F01D 25/24; F01D 21/045; B29L 2031/3076; B29L 2031/7504; F02C 7/04; F05D 2250/182; F05D 2250/232; F05D 2250/283; F05D 2300/603; Y02T 50/672
USPC ..................................................... 415/9, 200
See application file for complete search history.

(56) References Cited

U.S. PATENT DOCUMENTS

| | | | | |
|---|---|---|---|---|
| 5,437,538 A * | 8/1995 | Mitchell | .................. | D04C 1/02 |
| | | | | 415/9 |
| 5,685,940 A * | 11/1997 | Hopkins | .................. | B32B 3/12 |
| | | | | 156/286 |
| 5,688,353 A * | 11/1997 | Dublinski | ........... | B29C 43/3642 |
| | | | | 156/256 |
| 5,895,699 A * | 4/1999 | Corbett | ..................... | B32B 3/12 |
| | | | | 428/116 |
| 6,979,172 B1 * | 12/2005 | Mackenzie | ........... | F01D 21/045 |
| | | | | 415/9 |
| 7,138,031 B2 * | 11/2006 | Erickson | ............... | B29C 70/342 |
| | | | | 156/285 |
| 7,311,960 B2 * | 12/2007 | Lucas | ..................... | B32B 27/12 |
| | | | | 428/116 |
| 8,021,102 B2 * | 9/2011 | Xie | ....................... | B29C 70/086 |
| | | | | 415/9 |
| 8,425,178 B2 * | 4/2013 | Lenk | ..................... | F01D 21/045 |
| | | | | 415/9 |
| 9,126,691 B2 * | 9/2015 | Cloft | ....................... | F01D 25/24 |
| 9,833,930 B2 * | 12/2017 | Goering | ............... | F01D 21/045 |
| 9,909,447 B2 * | 3/2018 | Elisseeff | ................ | B29C 70/30 |
| 2004/0146393 A1 * | 7/2004 | Evans | .................... | B29C 33/40 |
| | | | | 415/9 |
| 2005/0161154 A1 * | 7/2005 | Anderson | ............... | B32B 27/12 |
| | | | | 156/278 |
| 2009/0152764 A1 * | 6/2009 | Xie | ......................... | B29C 70/48 |
| | | | | 264/219 |
| 2009/0155065 A1 * | 6/2009 | Xie | ......................... | F01D 21/045 |
| | | | | 415/200 |
| 2010/0077721 A1 * | 4/2010 | Marshall | ............... | F01D 21/045 |
| | | | | 60/39.091 |
| 2010/0111675 A1 * | 5/2010 | Wojtyczka | ........... | F04D 29/023 |
| | | | | 415/119 |
| 2011/0286839 A1 * | 11/2011 | Wojtyczka | ........... | F01D 21/045 |
| | | | | 415/173.4 |
| 2012/0099981 A1 * | 4/2012 | Verseux | ................ | F01D 21/045 |
| | | | | 415/200 |
| 2012/0134774 A1 * | 5/2012 | Clark | ..................... | F01D 25/24 |
| | | | | 415/9 |
| 2013/0153456 A1 * | 6/2013 | Zhu | ......................... | F01D 25/24 |
| | | | | 206/521 |
| 2016/0167333 A1 * | 6/2016 | Hethcock, Jr. | ........... | B32B 3/12 |
| | | | | 428/116 |
| 2017/0198716 A1 * | 7/2017 | Crutchfield | ........... | F04D 29/324 |
| 2017/0266893 A1 * | 9/2017 | Marin | ................... | F01D 21/045 |

FOREIGN PATENT DOCUMENTS

FR 3037854 A1 * 12/2016 ........... B29C 70/086
WO WO 2017/109403 A1 6/2017

* cited by examiner

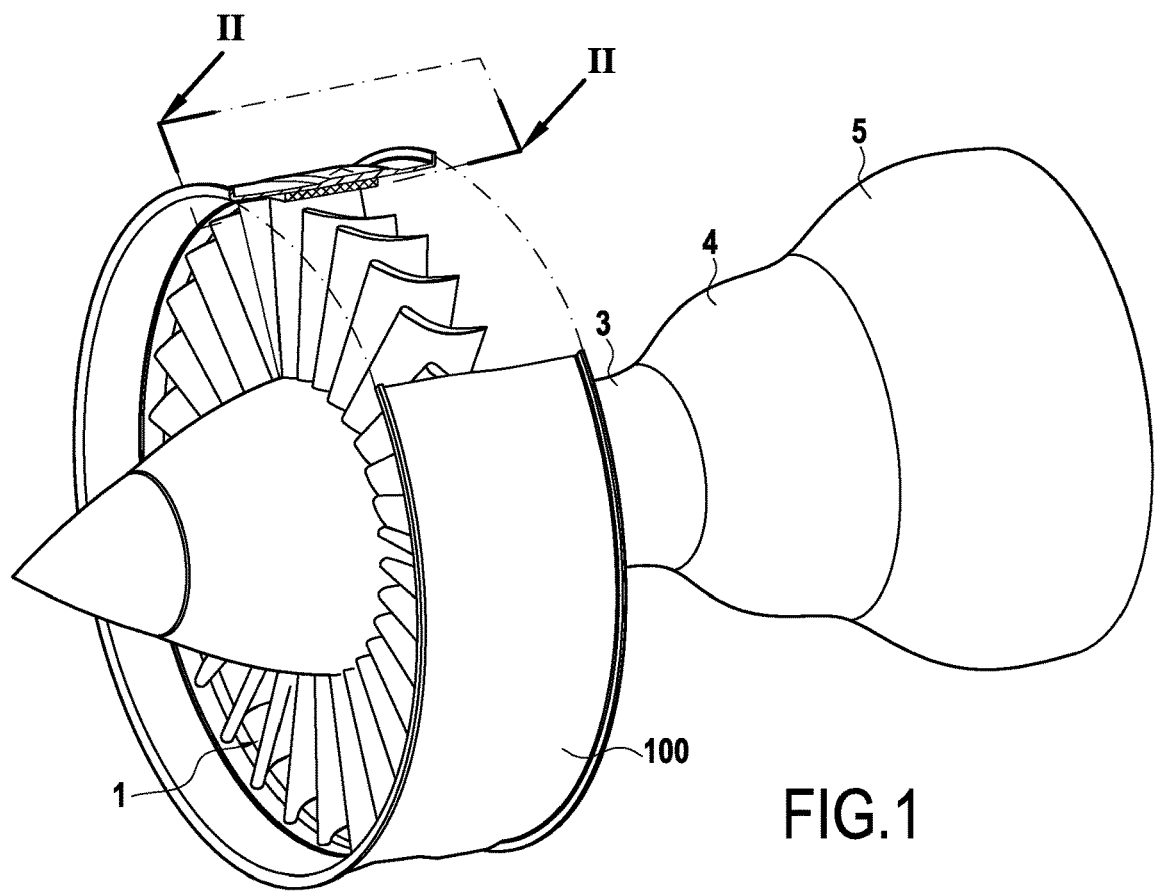
FIG.1
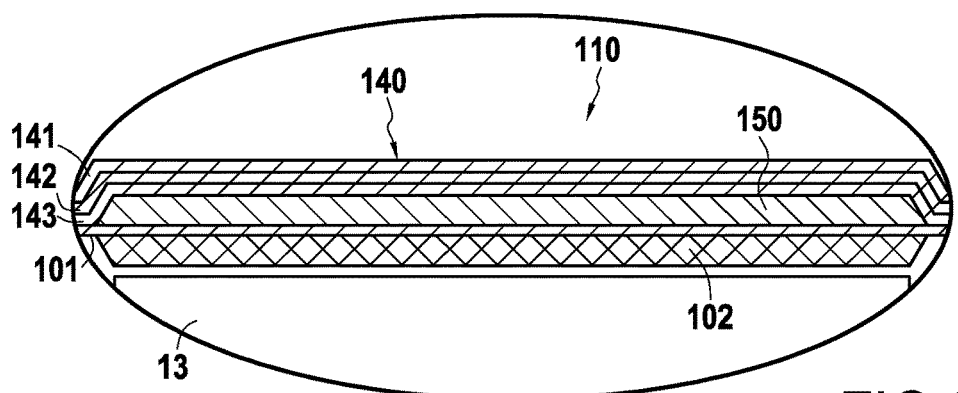
FIG.2
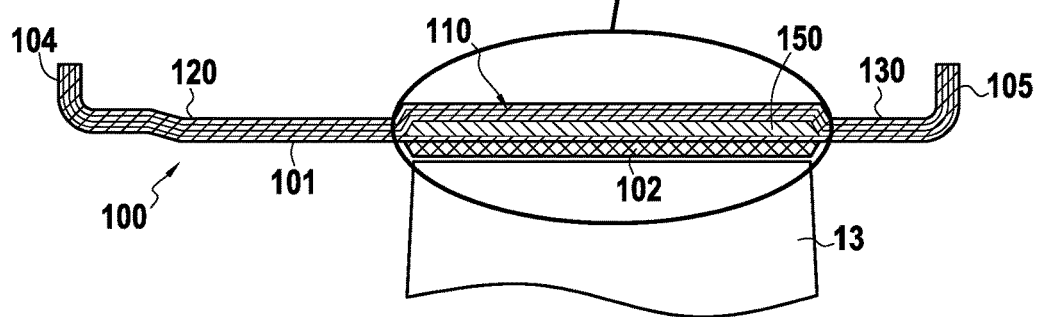

CASING OF REINFORCED COMPOSITE MATERIAL, AND A METHOD OF FABRICATING IT

CROSS REFERENCE TO RELATED APPLICATIONS

This application claims priority to French Patent Application No. 1761463, filed Nov. 30, 2017, the entire content of which is incorporated herein by reference in its entirety.

FIELD

The invention relates to gas turbine casings, and more particularly, but not exclusively, to gas turbine fan casings for aeroengines.

BACKGROUND

In a gas turbine aeroengine, the fan casing performs several functions. It defines the air inlet passage into the engine, it supports an abradable material facing the tips of the blades of the fan, it supports an optional soundwave absorber structure for acoustic treatment at the inlet of the engine, and it supports a retention shield or retention zone. The retention shield, or retention zone, constitutes a debris trap for retaining centrifugally-projected debris, such as objects that have been ingested or fragments of blades that have been damaged, so as to prevent them from passing through the casing and reaching other portions of the aircraft.

Casings, such as a fan casing, used to be made of metal material, but they are now made of composite material, i.e. from a fiber preform that is densified with an organic matrix, thereby enabling parts to be made that present smaller overall weight than the same parts would present when made out of metal material, while still presenting mechanical strength that is at least equivalent, if not greater.

A fan casing is made out of composite material with an organic matrix by winding a fiber texture onto a mandrel.

In order to form the retention zone, a thicker zone is formed in the casing, generally in the central portion of the casing. Such a thicker zone is generally made by increasing the size of the warp yarns used, or else by adding warp yarns.

Nevertheless, such a solution, in which the extra thickness forming the retention zone is obtained by adding warp yarns or by locally increasing their size, modifies the volume ratio between the warp yarns and the weft yarns in the thicker zone compared with the remainder of the casing. The volume ratio between the warp yarns and the weft yarns is determined so as to improve the ability of the casing to withstand cracking. The present solution thus tends to depart from the equilibrium ratio (50/50), and thus has the potential of reducing the ability of the casing to withstand cracking.

In order to limit modification to the volume ratio between the warp yarns and the weft yarns, it is known to increase the number of turns of fiber texture around the mandrel so as to obtain the desired thickness for the retention zone while limiting the increase in the size of the warp yarns or limiting any addition of warp yarns. Nevertheless, such a solution increases the thickness of the casing over its entire length, thereby increasing the weight of said casing.

SUMMARY

It is therefore desirable to be able to have available a solution for fabricating a casing possessing a retention zone for protecting the remainder of the engine and the aircraft from various kinds of debris that might be expelled, while also improving the ability of said casing to withstand cracking.

An aspect of the invention also seeks to fabricate a casing of light weight.

For this purpose, in a first aspect of the invention, there is provided a method of fabricating a gas turbine casing out of composite material of varying thickness, the method comprising:
  making a strip-shaped fiber texture by three-dimensional weaving;
  winding the fiber texture as a plurality of superposed layers onto a mandrel of profile corresponding to the profile of the casing that is to be fabricated, so as to obtain a fiber preform of shape corresponding to the shape of the casing that is to be fabricated; and
  densifying the fiber preform with a matrix;
  the method being characterized in that, before beginning to wind the fiber texture onto the mandrel, a reinforcing band of width smaller than the width of the fiber texture is placed on the mandrel in a zone that is to form a retention zone of the casing.

The use of a reinforcing band situated on the mandrel and onto which the fiber texture is wound makes it possible to form a zone of extra thickness on the casing so as to form of the retention zone, without modifying the volume ratio between the warp yarns and the weft yarns, and without increasing the thickness of the other zones of the casing.

The fabrication method may comprise the following characteristics, taken singly or in combination where technically possible:
  the reinforcing band has a section of trapezoidal shape;
  the mandrel comprises a central ring with two end plates situated at the ends of the central ring, the reinforcing band being wound around an outer surface of the central ring, the outer surface of the central ring being smooth;
  the mandrel comprises a central ring with two end plates situated at the ends of the central ring, the reinforcing band being wound around an outer surface of the central ring, the reinforcing band projecting radially outwards from the central ring;
  the reinforcing band is made from a textile strip;
  the reinforcing band is made from fibers selected from: carbon fibers; glass fibers; aramid fibers; ceramic fibers; and mixtures thereof;
  the reinforcing band is made of glass fibers;
  the reinforcing band is a unidirectional, bidirectional, or three-dimensional woven structure.

In a second aspect, the invention provides a casing for a gas turbine fan, the casing being made of composite material having varying thickness and comprising a fiber preform that comprises a plurality of superposed layers of a fiber texture in the form of a strip presenting three-dimensional weaving, the fiber preform being densified by a matrix, the casing being characterized in that a reinforcing band is present on the inside surface of the casing, the reinforcing band presenting width less than the width of the fiber texture and defining a retention zone of the casing.

The casing may comprise the following characteristics, taken singly or in combination where technically possible:
  the reinforcing band has a section of trapezoidal shape;
  the reinforcing band is made from a textile strip;
  the reinforcing band is made from fibers selected from: carbon fibers; glass fibers; aramid fibers; ceramic fibers; and mixtures thereof;

the reinforcing band is made of glass fibers;

the reinforcing band is a unidirectional sheet, a bidirectional woven structure, or a three-dimensional woven structure.

In a third aspect, the invention provides a gas turbine aeroengine having a fan casing in accordance with any of the above characteristics.

BRIEF DESCRIPTION OF THE DRAWINGS

Other characteristics and benefits of the invention appear from the following description of particular embodiments of the invention given as non-limiting examples and with reference to the accompanying drawings, in which:

FIG. 1 is a perspective view partially in section of an aeroengine having a fan casing made of composite material in accordance with an embodiment of the invention;

FIG. 2 is a section view on plane II-II of the FIG. 1 casing;

DETAILED DESCRIPTION

Figure 3:
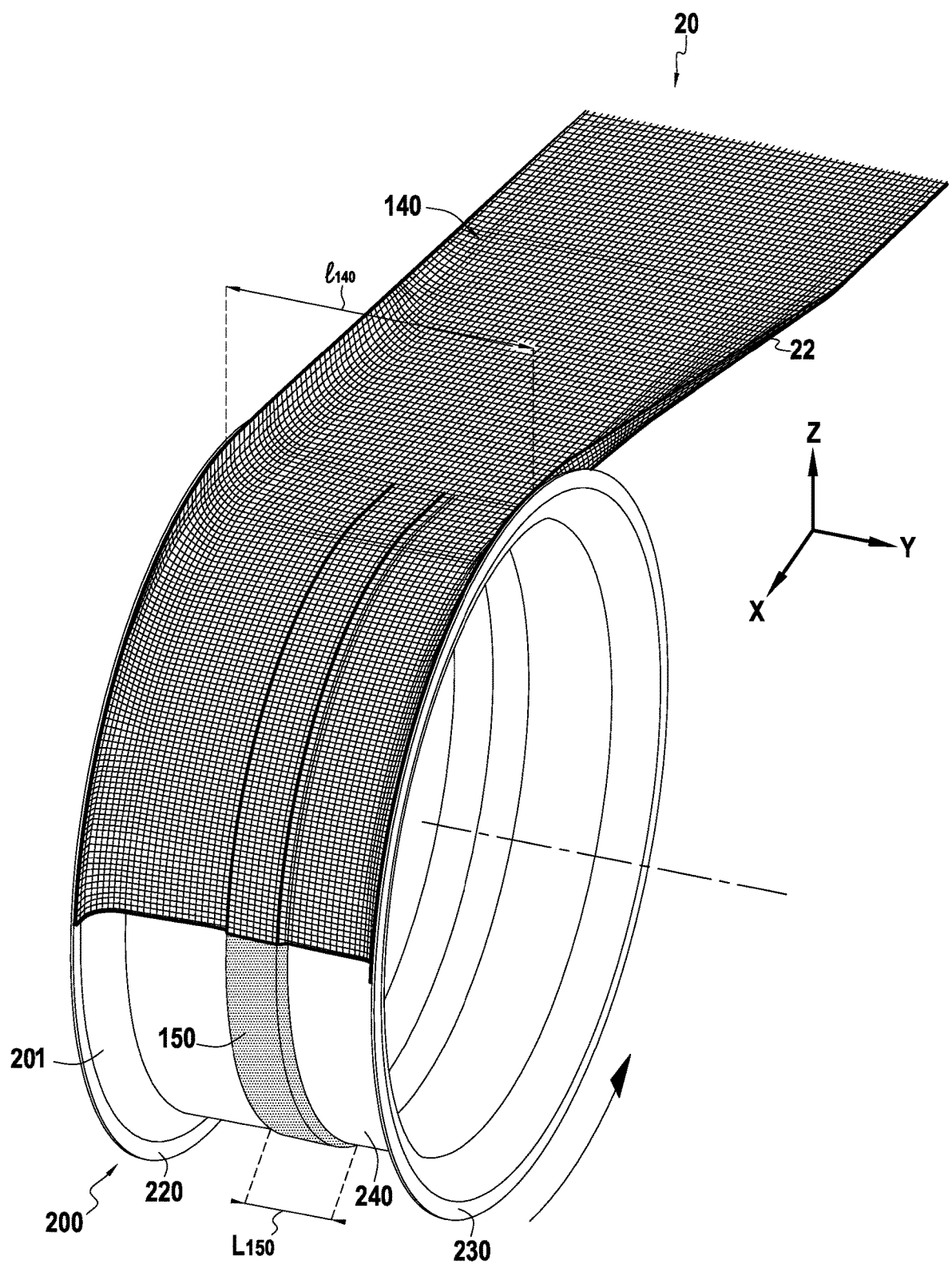
FIG. 3 is a diagrammatic view showing the fiber structure being wound around a mandrel having the reinforcing band placed thereabout in accordance with an embodiment of the invention.

The invention is described below in the context of its application to a fan casing for a gas turbine aeroengine.

Such an engine, as shown very diagrammatically in FIG. 1, comprises, from upstream to downstream in the flow direction of the gas stream: a fan 1 arranged at the inlet of the engine; a compressor (not shown); a combustion chamber 3; a high-pressure turbine 4; and a low-pressure turbine 5.

The engine is housed inside a casing that comprises several portions corresponding to the various elements of the engine. Thus, the fan 1 is surrounded by a fan casing 100.

FIG. 2 shows a profile of a fan casing 100 made of composite material of the kind that can be obtained by a method of the invention. The inside surface 101 of the casing defines the air inlet passage. It may be provided with an abradable coating layer 102 in register with the path followed by the tips of the fan blades, a blade 13 being shown in part in highly diagrammatic manner. The abradable coating is thus arranged on only a portion of the length (in the axial direction) of the casing. An acoustic treatment coating (not shown) may also be arranged on the inside surface 101, in particular upstream from the abradable coating 102.

The casing 100 may have outwardly-directed flanges 104 and 105 at its upstream and downstream ends in order to enable it to be mounted with and connected to other elements. Between its upstream and downstream ends, the casing 100 is of varying thickness, there being a thicker zone 110 of the casing that is of thickness greater than the adjacent portions 120 and 130. By way of example, the extra thickness may lie in the range 3 millimeters (mm) to 10 mm.

The thicker zone 110 extends both upstream and downstream on either side of the location of the fan, so as to form a retention zone or shield capable of retaining debris, particles, or objects ingested in the inlet of the engine, or resulting from damage to the blades of the fan, and projected radially as a result of the fan rotating, so as to prevent them from passing through the casing and damaging other portions of the aircraft.

The casing 100 is made of composite material comprising fiber reinforcement densified by a matrix. By way of example, the reinforcement is made of fibers of carbon, glass, aramid, or ceramic, and the matrix is made of polymer, e.g. an epoxy, bismaleimide, or polyimide polymer, out of carbon, or out of ceramic.

The fiber reinforcement is made by winding a fiber texture onto a mandrel, which fiber texture is made by three-dimensional weaving with thickness that varies, the mandrel having a profile that corresponds to the profile of the casing that is to be made. Beneficially, the fiber reinforcement constitutes a complete tubular fiber preform for the casing 100 forming a single part together with portions of reinforcement that correspond to the flanges 104 and 105.

In accordance with an embodiment of the invention, the fiber reinforcement of the casing 100 is constituted by a plurality of superposed layers 141 to 143 of a fiber texture 140 in the form of a strip presenting three-dimensional or multilayer weaving, each layer 141 to 143 corresponding to one turn of the winding of the fiber texture 140 (in FIG. 2, the layers 141 to 143 are densified by a matrix).

In addition, a reinforcing band 150 is present on the inside surface 101 of the casing 100. The reinforcing band 150 defines the inside surface 101 of the casing 100 over the thicker zone 110. The reinforcing band 150 is covered by the various layers 141 to 143 of the fiber texture 140, thus enabling the thicker zone 110 to be formed. The extra thickness of the thicker zone 110 is equal to the thickness of the reinforcing band 150. The thicker zone 110 serves to increase the mechanical properties of the casing 100 locally, and in particular its breaking strength, so as to form the retention zone.

The reinforcing band 150 is of width that is less than the width of the fiber texture 140. The width of the reinforcing band 150 defines the width of the thicker zone 110, and the width of the fiber texture is equal to the length of the casing 100 plus the length of the flanges 104 and 105.

The reinforcing band 150, in an embodiment, has a section of trapezoidal shape. Such a trapezoidally-shaped section enables the fiber texture 140 to be fitted more easily against the shape of the reinforcing band. The term "section" is used herein to mean a right section of the casing 100 in a section plane containing the axis of said casing 100.

The reinforcing band 150 may be a textile band made of fibers that may be carbon fibers, glass fibers, aramid fibers, ceramic fibers, or mixtures thereof. In an embodiment, the reinforcing band 150 is made of glass fibers. Specifically, glass fibers possess the benefit of having very good shear strength, thus serving to provide good strength to the retention zone. When the blades of the fan include metal elements, such as for example metal leading edge reinforcement, the reinforcing band 150 is, in an embodiment, made of glass fiber.

In a possible embodiment variant in which the reinforcing band is a textile band, the trapezoidal shape of the section of the reinforcing band 150 is obtained by stacking a plurality of layers of fibers, the layers being of progressively decreasing widths.

The reinforcing band 150 may be a two-directional or three-dimensional woven structure. The term "three-dimensional weaving" is used to mean weaving in which warp yarns pass through a plurality of layers of weft yarns, or weft yarns pass through a plurality of layers of warp yarns. The reinforcing band 150 may also be made from a unidirectional sheet, i.e. a textile structure in which all of the fibers extend in one direction only.

The reinforcing band 150 may also be made from a non-woven textile structure known as non-crimp fabric (NCF). The reinforcing band 150 may thus be made from a plurality of non-woven fibers that are compressed and bonded together by a binder. In an NCF textile structure, the fibers are directed in a plurality of directions.

In an embodiment, the various layers 141 to 143 have a volume ratio between the warp yarns and the weft yarns lying in the range 70/30 to 30/70, and, in an embodiment, that is equal to 50/50. Such a ratio serves to reinforce the ability of the casing 100 to withstand cracking.

The various layers 141 to 143 of the fiber texture 140 may be of thickness that varies along the length of the casing 100, for example, while ensuring that the volume ratio between the warp yarns and the weft yarns remains within the range 70/30 to 30/70. Such a characteristic makes it possible to vary the thickness of the casing 100 in zones other than the retention zone. Thus, the casing 100 may be of small thickness at its two ends including the flanges 104 and 105, e.g. a thickness lying in the range 10 mm to 20 mm, and of greater thickness in a central zone surrounding the retention zone 110, e.g. thickness lying in the range 30 mm to 40 mm, the retention zone 110 being the zone of the casing having the greatest thickness, e.g. thickness lying in the range 40 mm to 50 mm.

The various layers 141 to 143 may also possess thickness that is constant over the entire length of the casing 100. This enables the volume ratio between the warp yarns and the weft yarns to be kept constant over the entire length of the casing 100, for example in the range 70/30 to 30/70, and in an embodiment equal to 50/50.

As shown in FIG. 3, the fiber texture 140 is in the form of a strip that extends lengthwise in a circumferential direction X corresponding to the long direction of the warp yarns or strands and widthwise or transversely in an axial direction Y corresponding to the long direction of the weft yarns or strands.

As shown in FIG. 3, a fiber preform is made by winding onto a mandrel 200 the fiber texture 140 that is made by three-dimensional weaving, the mandrel having a profile that corresponds to the profile of the casing that is to be made, and the reinforcing band 150 is already situated on the mandrel 200. The width L150 of the reinforcing band 150 corresponds to the width of the retention zone that is to be formed on the casing, and the width l140 of the fiber texture 140 corresponds generally to the length of the casing. The width L150 of the reinforcing band 150 is thus smaller than the width l140 of the fiber texture 140.

In accordance with an embodiment of the invention, the reinforcing band 150 is arranged on the mandrel 200 in a zone that is to form the retention zone of the casing 100 prior to the step of winding the fiber texture 140. Thus, the fiber texture is wound over the reinforcing band 150 while said fiber texture 140 is being wound around the mandrel 200. The reinforcing band 150 may be arranged on the mandrel 200 by winding the reinforcing band 150 onto said mandrel 200.

Beneficially, the fiber preform constitutes complete tubular fiber reinforcement for the casing 100 forming a single part including a portion of greater thickness corresponding to the retention zone of the casing.

For this purpose, the mandrel 200 presents an outer surface 201 of profile corresponding to the inside surface of the casing that is to be made. By being wound on the mandrel 200, the fiber texture 140 fits closely to its profile. The mandrel 200 also includes two end plates 220 and 230 in order to shape the portions of the fiber preform that correspond to the flanges 104 and 105 of the casing 100. The mandrel 200 also has a central ring 240 that lies between the two end plates 220 and 230, the outer surface 201 of the mandrel 200 being defined by the central ring 240 and the two end plates 220 and 230. The reinforcing band 150 is wound around the outer surface of the central ring 240, the reinforcing band 150 projecting radially outwards from the central ring 240.

The outer surface of the central ring 240 is smooth, i.e. the outer surface of the central ring 240 does not have any groove dug into the outer surface of the central ring 240, nor does it have any ribs projecting radially outwards from said central ring 240.

In order to minimize any risk of the reinforcing band 150 sliding while the fiber texture 140 is being wound on the mandrel 200, the tension of the fiber texture 140 may be limited during the first turn of winding the fiber texture 140, after which the tension of the fiber texture 140 can be increased progressively during additional winding turns. In a possible variant, the tension of the fiber texture 140 is increased progressively on each turn.

Furthermore, in order to limit any risk of the reinforcing band 150 sliding on the mandrel 200 while winding the fiber texture 140, the adhesion of said reinforcing band 150 on the mandrel 200 can be improved by applying an adhesive, such as for example a tackifying resin. An unmolding agent can be used in order to remove the mandrel 200 after fabrication.

Figure 4:
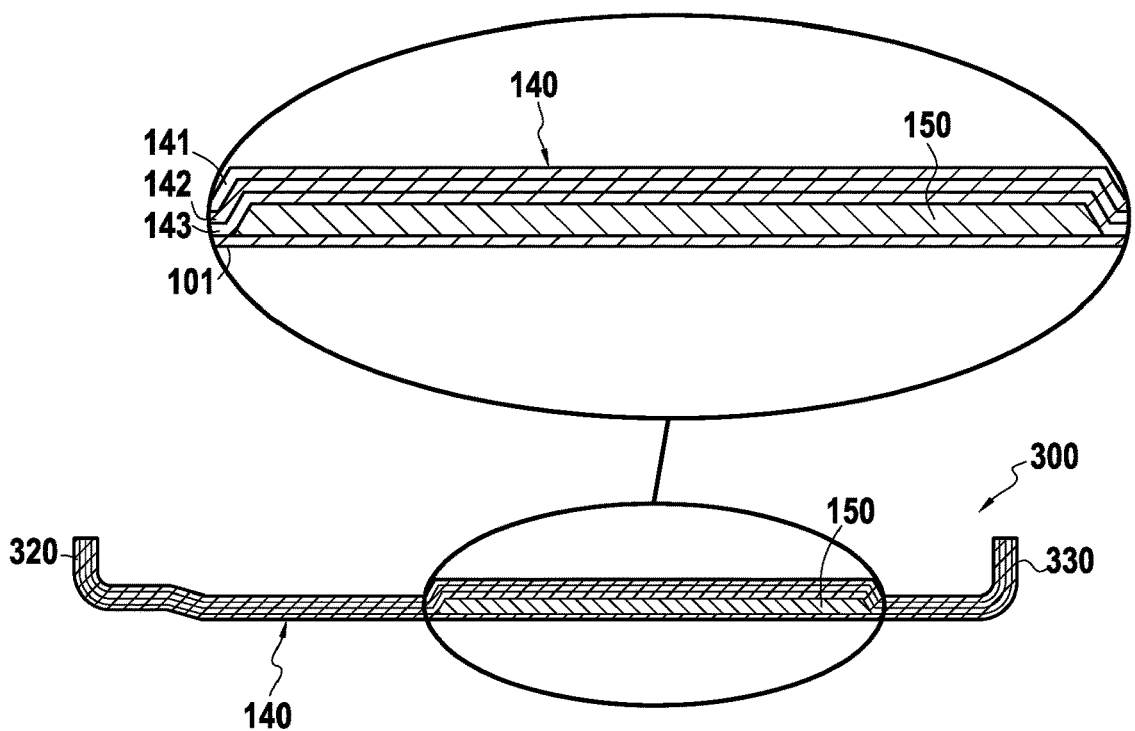
FIG. 4 is a section view showing the profile of the fiber preform obtained after winding the fiber structure around the mandrel and the reinforcing band in accordance with an embodiment of the invention.

FIG. 4 is a section view of the fiber preform 300 obtained after winding the fiber texture 140 onto the mandrel 200 around which the reinforcing band 150 has previously been arranged. The number of layers or turns is a function of the desired thickness and of the thickness of the fiber texture 140. It is desirably not less than two. In the previously-described example, the preform 300 comprises three layers 141 to 143 of fiber texture 140, together with a layer of reinforcing band 150.

A fiber preform 300 is obtained having a thicker portion 310 formed by winding the fiber texture 140 over the reinforcing band 150. The fiber preform 300 also has end portions 320 and 330 corresponding to the flanges 104 and 105 of the casing 100.

The fiber preform 300 is then densified with a matrix.

Densifying the fiber preform 300 consists in filling in the pores of the preform with the material constituting the matrix, so that it occupies the volume of the pores in full or in part.

The matrix may be obtained in known manner using a liquid technique.

Figure 5:
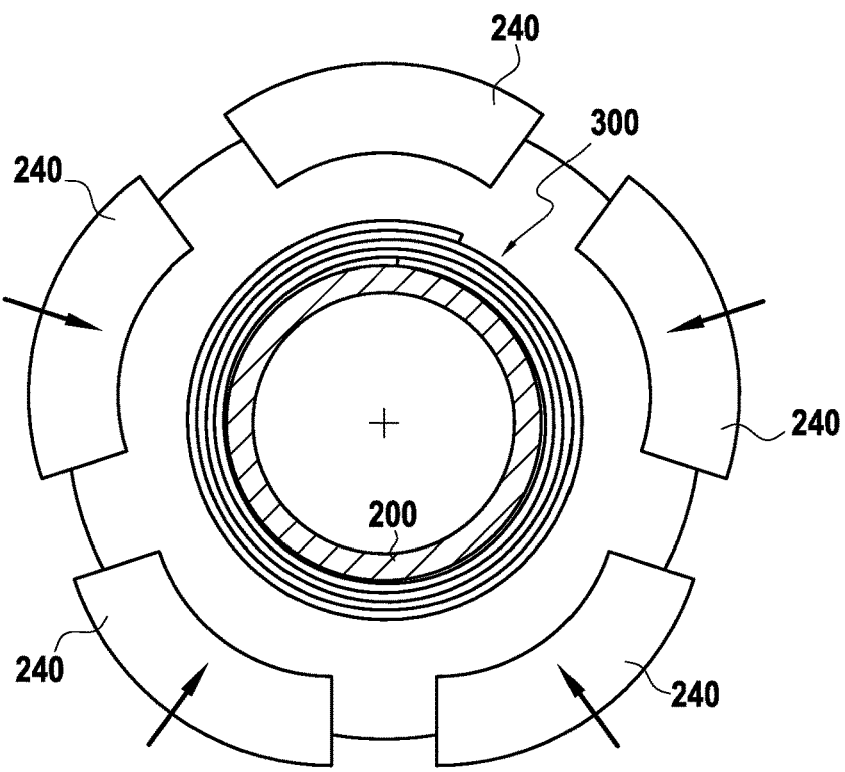
FIG. 5 is a diagrammatic view showing tooling for densifying the FIG. 4 fiber preform with a matrix in accordance with an embodiment of the invention.

The liquid technique consists in impregnating the fiber preform 300 with a liquid composition containing an organic precursor for the material of the matrix. The organic precursor is usually in the form of a polymer, such as a resin, possibly diluted in a solvent. The fiber preform 300 is placed in a mold that can be closed in sealed manner so as to have a recess with the shape of the final molded part. As shown in FIG. 5, in this example, the fiber preform 300 is placed between a plurality of sectors 240 forming a mold cover and the mandrel 200 forming a support, these elements presenting respectively the outside shape and the inside shape of the casing that is to be made. Thereafter, the liquid matrix precursor, e.g. a resin, is injected throughout the cavity in order to impregnate all of the fiber portion of the preform.

The precursor is transformed into an organic matrix, i.e. it is polymerized, by performing heat treatment, generally by heating the mold after eliminating any solvent and curing the polymer, the preform continuing to be held in the mold of shape corresponding to the shape of the part that is to be made. In particular, the organic matrix may be obtained from epoxy resins, e.g. such as high-performance epoxy resin, or from liquid precursors for carbon or ceramic matrices.

When forming a carbon or ceramic matrix, the heat treatment consists in pyrolysing the organic precursor in order to transform of the organic matrix into a carbon or ceramic matrix depending on the precursor that is used and on the conditions of pyrolysis. By way of example, liquid precursors of carbon may be resins having a relatively high coke content, such as phenolic resins, while liquid precursors of ceramic, in particular of SiC, may be resins of the polycarbosilane (PCS) type or of the polytitanocarbosilane (PTCS) type or of the polysilazane (PSZ) type. A plurality of consecutive cycles, from impregnation to heat treatment, may be performed in order to reach the desired degree of densification.

In an aspect of the invention, the fiber preform 300 may be densified by performing the well known resin transfer molding (RTM) method. In the RTM method, the fiber preform is placed in a mold having the shape of the casing that is to be made. A thermosetting resin is injected into the inside space defined between the mandrel 200 and the mold covers 240. A pressure gradient is generally set up in this inside space between the location where the resin is injected and orifices for discharging the resin, so as to control and optimize impregnation of the preform with the resin.

By way of example, the resin used may be an epoxy resin. Resins appropriate for RTM methods are well known. They present low viscosity in order to facilitate injecting them between the fibers. The temperature class and/or the chemical nature of the resin is/are determined as a function of the thermomechanical stresses to which the part is to be subjected. Once the resin has been injected throughout the reinforcement, it is polymerized by heat treatment in compliance with the RTM method.

After injection and polymerization, the part is unmolded. Finally, the part is trimmed in order to remove excess resin and chamfers are machined in order to obtain the casing 100 as shown in FIGS. 1 and 2.

The invention claimed is:

1. A method of fabricating a gas turbine casing out of composite material of varying thickness, the method comprising:
   making a strip-shaped fiber texture by three-dimensional weaving;
   winding the fiber texture as a plurality of superposed layers onto a mandrel having a profile corresponding to a profile of the casing to be fabricated, so as to obtain a fiber preform having a shape corresponding to a shape of the casing to be fabricated; and
   densifying the fiber preform with a matrix;
   wherein, before winding the fiber texture onto the mandrel, a reinforcing band that is formed as a textile strip and of a width that is smaller than a width of the fiber texture is placed on the mandrel in an area that is to form a retention zone of the casing, wherein the reinforcing band has a section of trapezoidal shape and is densified with said matrix, the section of trapezoidal shape having two acute angles at a base of the reinforcing band, said base and a side of the reinforcing band opposite said base being parallel to each other, wherein the base of the reinforcing band defines an inside surface of the casing and the strip-shaped fiber texture made by three-dimensional weaving is wound around the reinforcing band and itself over several turns such that the base of the reinforcing band is out of contact with the plurality of superposed layers.

2. The method according to claim 1, wherein the mandrel comprises a central ring with two end plates situated at respective ends of the central ring, the reinforcing band being wound around a smooth outer surface of the central ring.

3. The method according to claim 1, wherein the mandrel comprises a central ring with two end plates situated at respective ends of the central ring, the reinforcing band being wound around an outer surface of the central ring such that the reinforcing band is projecting radially outwards from the central ring.

4. The method according to claim 1, wherein the reinforcing band is made from fibers selected from: carbon fibers; glass fibers; aramid fibers; ceramic fibers; and mixtures thereof.

5. The method according to claim 4, wherein the reinforcing band is made of glass fibers.

6. The method according to claim 1, wherein the reinforcing band is a unidirectional sheet, a bidirectional woven structure, or a three-dimensional woven structure.

7. A casing of a gas turbine fan, the casing being made of composite material having varying thickness and comprising a fiber preform that comprises a plurality of superposed layers of a fiber texture formed as a strip presenting three-dimensional weaving, said fiber preform being densified by a matrix, wherein the casing further comprises a reinforcing band formed as a textile strip, the reinforcing band presenting a width that is less than a width of the fiber texture and defining a retention zone of the casing, wherein the reinforcing band has a section of trapezoidal shape and is densified by said matrix, the section of trapezoidal shape having two acute angles at a base of the reinforcing band, said base and a side of the reinforcing band opposite said base being parallel to each other, wherein the base of the reinforcing band defines an inside surface of the casing and the strip presenting three-dimensional weaving is wound around the reinforcing band and itself over several turns such that the base of the reinforcing band is out of contact with the plurality of superposed layers.

8. The casing according to claim 7, wherein the reinforcing band is made from fibers selected from: carbon fibers; aramid fibers; ceramic fibers; and mixtures thereof.

9. The casing according to claim 8, wherein the reinforcing band is made of glass fibers.

10. The casing according to claim 7, wherein the reinforcing band is a unidirectional sheet, a bidirectional woven structure, or a three-dimensional woven structure.

11. A gas turbine aeroengine having the casing according to claim 7.

12. The casing according to claim 7, wherein the reinforcing band has a top surface and a bottom surface opposite the top surface, wherein one of the plurality of superposed layers covers said top surface of the reinforcing band, said one of the plurality of superposed layers having a lower surface that includes (a) a first surface portion in contact with said top surface of the reinforcing band and (b) a second surface portion that is flush with the bottom surface of the reinforcing band.

13. The casing according to claim 7, wherein the casing has a cylindrical shape.

* * * * *